Sept. 3, 1929.  J. W. COX  1,726,809
CONDUIT FITTING
Filed May 20, 1925
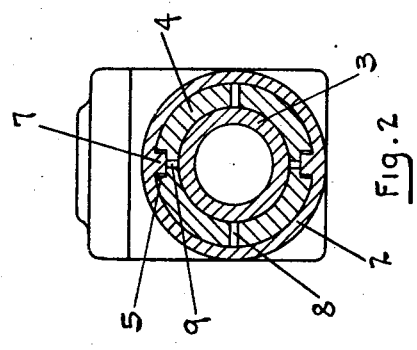
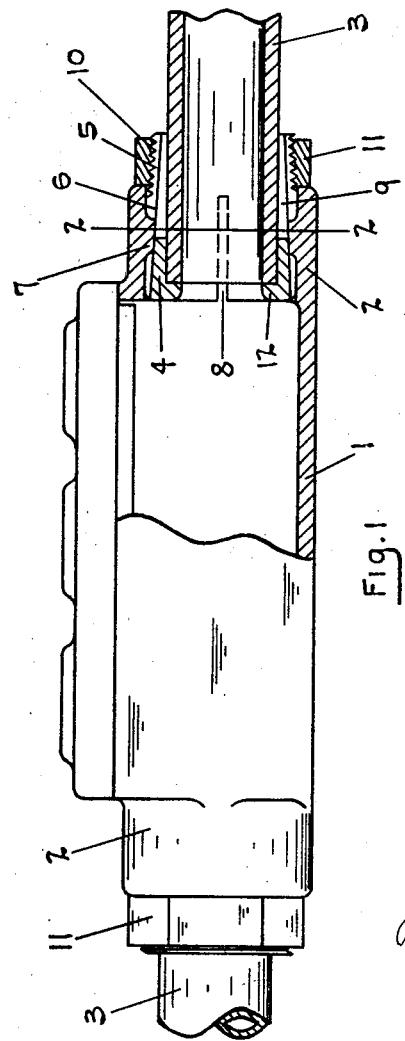

Patented Sept. 3, 1929.

1,726,809

UNITED STATES PATENT OFFICE.

JOHN WILLIAM COX, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed May 20, 1925. Serial No. 31,559.

This invention is designed to improve conduit fittings and is adapted particularly for use with threadless conduits. It is particularly advantageous in the manner of engaging or clamping the conduit in place. Features and details of the invention will appear from the specification and claims.

The invention is illustrated in the accompanying drawings as follows:—

Fig. 1 shows a side elevation, partly in section.

Fig. 2 a section on the line 2—2 in Fig. 1.

1 marks the body of the fitting which is exemplified in the drawings as a conduit box, but it will be understood that the body, or part between the conduits is of no importance with relation to this invention.

An extension 2 projects from the body having a conduit receiving opening and a conduit 3 is shown in place.

A sleeve 4 is mounted in the opening in the extension. This sleeve has axially extending key slots or grooves 5, the bottom walls 6 of which are inclined or wedging. Projections 7 extend inwardly from the extension 2 into the grooves 5 locking the sleeve against rotation and engaging the walls 6 and through the wedging action of the walls on the projection contracting the sleeve into engagement with the conduit.

The sleeve has the slits 8 extending inwardly from the inner end of the sleeve, these slits being preferably at right angles to the radial line extending to the grooves 5. Slits 9 extend inwardly from the outer end of the sleeve and preferably open into the grooves 5.

The sleeve is screw-threaded at 10, this screw thread being tapered and a nut 11 having a similar tapered thread is screwed on to the sleeve against the end of the extension. The action of the nut draws the sleeve into the extension and the action of the projections on the inner wall of the grooves contracts the inner end of the sleeve while the tapered screw contracts the outer end of the sleeve as the nut advances. Thus the sleeve is uniformly contracted from end to end and thus has a more effective clamping action on the conduit and is more evenly distributed so that a lighter conduit may be used if desired.

The sleeve is provided with the usual guard shoulder 12 at its inner end which extends over the end of the conduit.

What I claim as new is:—

1. In a conduit fitting, the combination of a body having a conduit receiving opening; a one-piece contractible sleeve in the opening having an axially extending groove therein with the wedging inner surface; means extending from the wall of the opening into the groove locking the sleeve against turning and engaging the inner wall to contract the sleeve with an axial movement of the sleeve, the sleeve having a screw-threaded end extending without the opening; and a nut on the screw-threaded end operating against the body for drawing the sleeve into the opening and contracting the sleeve, said nut and screw threads having a tapered engagement contracting the sleeve as the nut advances.

2. In a conduit fitting, the combination of a conduit receiving opening; a one-piece contractible sleeve in the opening having an axially extending key groove therein with a wedging inner wall and a slit extending into the sleeve and opening into the groove; means extending from the wall of the opening into the groove locking the sleeve against turning and engaging the inner wall to contract the sleeve with an axial movement of the sleeve; and means drawing the sleeve into the opening to contract the same.

3. In a conduit fitting, the combination of a body having a conduit receiving opening therein with inwardly extending projections; a one-piece contractible sleeve within the opening, said sleeve having grooves receiving the projections, the inner walls of the grooves forming wedging surfaces engaging the projections and forcing the contraction of the sleeve with an axial movement thereon, said sleeve having an extending screw-threaded end and slits extending into the sleeve from the screw-threaded end opening into the grooves; and a nut operating on the extending screw threads and against the body for drawing the sleeve into the opening and contracting the sleeve, said nut and screw threads having a tapered relation contracting the sleeve as the nut advances.

4. In a conduit fitting, the combination of a body having a conduit-receiving opening; a contractible sleeve having a slit extending from the inner end of the sleeve outwardly and a key groove therein; means extending from the wall of the opening into the key groove; said sleeve and opening having wedging engaging surfaces contracting the sleeve with an outward movement of the sleeve in the opening; and means drawing the sleeve into the opening and toward the outside of the body.

5. In a conduit fitting, the combination of a body having a conduit-receiving opening with an inwardly extending key projection; a contractible sleeve having a slit extending from its inner end and a groove into which the key projection extends, the inner wall of the groove and the inner wall of the key projection having wedging engaging surfaces adapted to contract the sleeve upon an endwise movement of the sleeve; and means drawing the sleeve into the opening to contract the same.

In testimony whereof I have hereunto set my hand.

JOHN WILLIAM COX.